Patented Oct. 10, 1944

2,359,912

UNITED STATES PATENT OFFICE 2,359,912

SULPHANILAMIDE DERIVATIVES

Ernest Haworth and Francis Leslie Rose, Blackley, Manchester, England, assignors to Imperial Chemical Industries Limited, a corporation of Great Britain No Drawing. Application December 31, 1942, Serial No. 470,823. In Great Britain December 15, 1941

13 Claims. (Cl. 260—397.7)

This invention relates to the manufacture of sulphanilamide derivatives and more particularly to the manufacture of sulphanilyl guanidine and compounds readily convertible thereto. Sulphanilyl guanidine (i. e. 4-aminobenzenesulphonylguanidine), as is known, is valuable itself as an anti-bacterial agent and also as an intermediate in the manufacture of other therapeutically active compounds.

The invention provides a process for the manufacture of p-substituted benzenesulphonylguanidines which comprises causing a sulphonamido compound of the formula

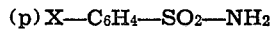
(p) X—$C_6H_4$—$SO_2$—$NH_2$ wherein X stands for an amino group or a nitrogen-containing group which is readily convertible to an amino group, for example, a nitro or acylamino group, to react, in the presence of an inorganic or strong organic base, with a salt of an isothiourea of the formula $NH_2$—C(NH)—S—R, wherein R stands for a monovalent organic radical which is joined to the sulphur atom through a carbon atom. There are thus produced sulphanilyl guanidine and other benzenesulphonylguanidines simply related thereto, such as p-nitro- and p-acylamino-benzenesulphonylguanidines. These latter two compounds are readily converted, by reduction and hydrolysis respectively, into sulphanilyl guanidine.

As isothioureas suitable for use as starting materials there may be mentioned alkyl, alkenyl, hydroxyalkyl, alkoxyalkyl, cycloalkyl, cycloalkenyl, aralkyl, aralkenyl and aryl isothioureas, for example, methyl, ethyl, allyl, benzyl, cyclohexyl, p-tolyl, and γ-hydroxypropyl isothioureas. Also compounds wherein the radical R itself carries isothiourea groupings may be used. Thus there may be used the bis-isothioureas of the formula $NH_2$—C(NH)—S—R'—S—C(NH)—$NH_2$, wherein R' represents the radical derived by removing a hydrogen atom from the group R mentioned above, for example, the bis-isothiourea obtained by interaction of two molecular proportions of thiourea with β:β'-dichlorodiethyl ether. The isothioureas are used in the form of their salts, for example, hydrochlorides, hydrobromides, sulphates or nitrates. In technical practice we prefer to use methyl isothiourea sulphate because of its ready availability.

The exact course of the reaction is not completely clear and the yield may vary according to the order in which the reagents are brought into the reaction zone. We prefer to mix the sulphonamido compound with the base and the solvent, if any, and then add the isothiourea salt gradually at elevated temperature. In general the reaction must be carried out at a temperature exceeding 90° C., and preferably at a temperature of 120°-200° C. if a technically attractive yield is to be obtained. If one of the more highly reactive isothioureas is used and added to the reaction system at too low a temperature, as, for example, by adding methyl isothiourea sulphate to a mixture of sulphonamido compound, sodium phenate and phenol at 70° C., the isothiourea appears to decompose and/or to condense with itself, in preference to reacting with the sulphonamido compound, and the yield of the sulphonylguanidine is very poor.

The base may be present in the reaction system to some extent in the form of a salt of the sulphonamido compound and, in fact, it may, if desired, be added to the reaction mixture in that form. Thus a preformed sodium salt of sulphanilamide or of nitro- or acetylamino- benzenesulphonamide may be used. Alternatively, the base may be added separately, either as such or even in the form of a salt with a weak acid. The base may be inorganic, for example, ammonia, magnesium oxide, barium oxide, or sodium or potassium hydroxide, or it may be a strong organic base such as thimethylamine, triethanolamine or 2-aminopyridine. The organic bases appear to work better with p-nitrobenzenesulphonamide; they do not give good yields with sulphanilamide or its acetyl compound. As said, the base may be added to the reaction mixture in the form of a salt with a weak acid such as sodium carbonate, sodium acetate, borax, sodium ethylate or sodium phenate. The base is preferably, but not necessarily, used in amount at least stoichiometrically equivalent to the isothiourea salt. We prefer, in fact, to use equimolecular proportions of the sulphonamido compound and the isothiourea salt and a slight excess of the base.

The reaction is preferably, but not necessarily, carried out in presence of a high-boiling solvent or diluent. This should, of course, be inert to the product and to the main reagents, namely the isothiourea and the sulphonamido compound, but need not be completely inert to the base. It may, indeed, be a weak acid which forms a salt with the base. Thus, for example, the reaction is very conveniently carried out in phenol or cresylic acid as solvent, when, if caustic soda is used as the base, it unites therewith to form the sodium phenolate. Alternatively an excess of sulphanilamide may be used as the solvent; the base may then combine with this, at least in part. If desired, but less advantageously, other high-boiling solvents, for example, ethylene glycol, xylene or o-dichlorobenzene may be used.

The conversion of the p-acylamino- or p-nitrobenzenesulphonylguanidine to sulphanilyl guanidine is carried out by methods known per se. The acylamino-compound can be readily hydrolysed to sulphanilyl guanidine by heating it for a short time with a dilute mineral acid. The reduction of the nitro-compound is brought about under neutral or acid conditions, for example by heating it in ethanol solution with fine iron filings and aqueous calcium chloride or dilute hydrochloric acid. Alkaline reduction is unsatisfactory; it leads to decomposition.

The invention is illustrated, but not limited, by the following examples in which the parts are by weight.

Example 1

19.4 parts of the sodium salt of 4-aminobenzenesulphonamide are dissolved in 25 parts of phenol which are stirred and heated to 160° C. 13.9 parts of S-methylisothiourea sulphate are gradually added, in portions, during 2 hours. The reaction mixture effervesces and methyl mercaptan is given off. When effervescence has ceased the reaction mixture is cooled to about 80° C. and 100 parts of benzene are added whereupon a precipitate is formed. This is filtered off and washed with benzene. It contains crude 4-aminobenzenesulphonylguanidine which is isolated by stirring the precipitate with 10 parts of caustic soda dissolved in 175 parts of cold water, whereupon the 4-aminobenzenesulphonylguanidine remains undissolved and is filtered off, washed with water and dried.

It is purified, if necessary, by recrystallisation from water. It is thereby obtained in the form of colourless needles of the monohydrate which lose water when heated at 100° C. and then melt at 189° C.

Example 2

19.4 parts of the sodium salt of 4-aminobenzenesulphonamide are dissolved in 35 parts of phenol which are stirred and heated to 140° C. 15.3 parts of S-ethylisothiourea sulphate are gradually added, in portions, during 2 hours. The reaction mixture effervesces and ethyl mercaptan is given off. When effervescence has ceased the reaction mixture is cooled to about 80° C. and 100 parts of benzene are added, whereupon a precipitate is formed. This is filtered off and washed with benzene. It contains crude 4-aminobenzenesulphonylguanidine which is separated by stirring the precipitate with 10 parts of caustic soda dissolved in 175 parts of cold water, whereupon the 4-aminobenzenesulphonylguanidine remains undissolved and is filtered off, washed with water and dried.

It may be purified by the method described in Example 1.

Example 3

19.4 parts of the sodium salt of 4-aminobenzenesulphonamide are dissolved in 35 parts of 4-aminobenzenesulphonamide which are stirred and heated to 190° C. 13.9 parts of S-methylisothiourea sulphate are gradually added, in portions, during 1 hour. The reaction mixture effervesces and methyl mercaptan is given off. Stirring is continued for a further 15 minutes. The product is then dissolved in 150 parts of boiling water and the solution is cooled. The resulting suspension is stirred and 13 parts of caustic soda dissolved in 30 parts of cold water are added. 4-aminobenzenesulphonylguanidine remains undissolved and is filtered off, washed with water and dried.

It may be purified by the method described in Example 1.

Example 4

19.4 parts of the sodium salt of 4-aminobenzenesulphonamide and 25 parts of phenol are stirred and heated together at 160° C. 15.4 parts of S-allylisothiourea hydrochloride are added, in portions, during 2 hours. The reaction mixture effervesces and allylmercaptan is given off. When effervescence has ceased the reaction mixture is cooled to about 80° C. and 100 parts of benzene are added whereupon a precipitate is formed. This is filtered off and washed with benzene. It contains crude 4-aminobenzenesulphonylguanidine which is isolated by stirring the precipitate with 10 parts of caustic soda dissolved in 175 parts of cold water, whereupon the 4-aminobenzenesulphonylguanidine remains undissolved and is filtered off, washed with water and dried.

It is purified, if desired, by recrystallisation from water. It is thereby obtained in the form of colourless needles of the monohydrate which lose water when heated at 100° C. and then melt at 189° C.

Example 5

19.4 parts of the sodium salt of 4-aminobenzenesulphonamide and 25 parts of phenol are stirred and heated together at 160° C. 17.0 parts of S-γ-hydroxypropylisothiourea hydrochloride are added, in portions, during 2 hours. The reaction mixture is stirred with 200 parts of cold water and 13 parts of caustic soda dissolved in 30 parts of cold water are added. The crude 4-aminobenzenesulphonylguanidine remains undissolved and is filtered off and washed. It is heated with 100 parts of water and 5 parts of decolourising charcoal and the solution is filtered. The filtrate is cooled whereupon 4-aminobenzenesulphonylguanidine separates in the form of colourless needles.

It is purified further, if necessary, by recrystallisation from water. It is thereby obtained in the form of colourless needles of the monohydrate which lose water when heated at 100° C. and then melt at 189° C.

Example 6

19.4 parts of the sodium salt of 4-aminobenzenesulphonamide and 25 parts of phenol are stirred and heated to 160° C. 23.9 parts of S-cyclohexylisothiourea hydrobromide are added, in portions, during 2 hours. The reaction mixture is stirred with 200 parts of cold water and 13 parts of caustic soda dissolved in 30 parts of cold water are added. The crude 4-aminobenzenesulphonylguanidine remains undissolved and is filtered off and washed.

It is purified by the method described in Example 4.

Example 7

19.4 parts of the sodium salt of 4-aminobenzenesulphonamide and 25 parts of phenol are stirred and heated to 160° C. 14.8 parts of the di-hydrochloride of the bisisothiourea of the formula $NH_2—C(NH)—S—CH_2CH_2—O—$
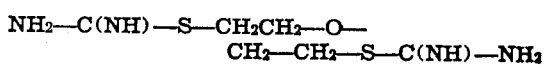

(which may be termed 3-oxa-pentylene-1:5-di-isothiourea and which is conveniently made by interaction of isothiourea with $\beta:\beta'$-dichlorodiethyl ether in ethanol solution) are added, in portions, during 2 hours. The reaction mixture is cooled to about 80° C. and 100 parts of benzene are added whereupon a precipitate is formed. This is filtered off and washed with benzene. It contains crude 4-aminobenzenesulphonylguanidine which is isolated by stirring the precipitate with 10 parts of caustic soda dissolved in 175 parts of cold water. The 4-aminobenzenesulphonylguanidine remains undissolved and is filtered off, washed with water and dried.

It can be purified, if desired, by the method described in Example 4.

*Example 8*

19.4 parts of the sodium salt of 4-aminobenzenesulphonamide and 25 parts of phenol are stirred and heated at 160° C. 22.7 parts of S-p-tolylisothiourea nitrate are added, in portions, during 2 hours. The reaction mixture is cooled to about 80° C. and 100 parts of benzene are added whereupon a precipitate is formed. This is filtered off and washed with benzene. It contains crude 4-aminobenzenesulphonylguanidine which is isolated by stirring the precipitate with 10 parts of caustic soda dissolved in 175 parts of cold water. The 4-aminobenzenesulphonylguanidine remains undissolved and is filtered off, washed with water and dried.

It can be purified, if desired, by the method described in Example 4.

*Example 9*

17.2 parts of 4-aminobenzenesulphonamide and 25 parts of phenol are heated together and stirred at 160° C. and a slow stream of ammonia gas is passed in until the mixture is saturated therewith. Then 13.9 parts of S-methylisothiourea sulphate are added in portions during 2 hours, the gas stream being continued during this addition. Effervescence occurs and methyl mercaptan is evolved. When this has ceased the reaction mixture is cooled to about 80° C. and 100 parts of benzene are added, whereupon a precipitate is formed. This is filtered off and washed with benzene. It contains crude 4-aminobenzenesulphonylguanidine, which is separated by stirring the precipitate with 10 parts of caustic soda dissolved in 175 parts of cold water. The 4-aminobenzenesulphonylguanidine remains undissolved and is filtered off, washed with water and dried.

It is purified, if necessary, by recrystallisation from water, whereby it is obtained in the form of colourless needles of the monohydrate which lose water when heated at 100° C. and then melt at 189° C.

*Example 10*

17.2 parts of 4-aminobenzenesulphonamide, 40 parts of phenol and 4 parts of magnesium oxide are stirred and heated together at 180° C. for half an hour. At least a part of the magnesium oxide remains suspended in the mixture. 13.9 parts of S-methylisothiourea sulphate are added in portions during 2 hours. The reaction mixture effervesces and methyl mercaptan is given off. When effervescence has ceased the reaction mixture is cooled. 200 parts of water are added. 13 parts of caustic soda dissolved in 30 parts of cold water are then added and the undissolved solid matter is filtered off. It consists of a mixture of crude 4-aminobenzenesulphonylguanidine, magnesium oxide and magnesium hydroxide. It is heated with 150 parts of water whereupon the 4-aminobenzenesulphonylguanidine dissolves out. The solution is filtered hot and cooled. 4-aminobenzenesulphonylguanidine separates from the solution and is filtered off, washed and dried. It may be purified by recrystallisation from water.

*Example 11*

17.2 parts of 4-aminobenzenesulphonamide, 25 parts of phenol and 4 parts of powdered sodium hydroxide are stirred and heated together at 160° C. 13.9 parts of S-methylisothiourea sulphate are gradually added, in portions, during 2 hours. Effervescence occurs and methyl mercaptan is evolved. When this has ceased the reaction mixture is cooled to about 80° C. and 100 parts of benzene are added whereupon a precipitate is formed. This is filtered off and washed with benzene. It contains crude 4-aminobenzenesulphonylguanidine which is isolated by stirring the precipitate with 10 parts of caustic soda dissolved in 175 parts of cold water, whereupon the 4-aminobenzenesulphonylguanidine remains undissolved and is filtered off, washed and dried.

It may be purified by recrystallisation from water.

*Example 12*

17.2 parts of 4-aminobenzenesulphonamide, 25 parts of phenol and 8.6 parts of barium hydroxide are stirred and heated together at 160° C. To the resulting solution are added 13.9 parts of S-methylisothiourea sulphate, in portions, during 2 hours. Effervescence occurs and methyl mercaptan is evolved. When this has ceased the reaction mixture is cooled to about 80° C. and 150 parts of benzene are added whereupon a precipitate is formed. This is filtered off and washed with benzene. The precipitate, which contains crude 4-aminobenzenesulphonylguanidine, is heated with 400 parts of water and 5 parts of decolourising charcoal and the solution is filtered. On cooling, 4-aminobenzenesulphonylguanidine separates out. 10 parts of caustic soda dissolved in 30 parts of cold water are added and the mixture is well stirred. The 4-aminobenzenesulphonylguanidine remains undissolved and is filtered off, washed with water and dried.

It may be purified by recrystallisation from water as described in Example 9.

*Example 13*

17.2 parts of 4-aminobenzenesulphonamide are dissolved in a mixture of 11.6 parts of sodium phenate and 16 parts of phenol which is stirred and heated to 160° C. 13.9 parts of S-methylisothiourea sulphate are added in portions during 2 hours. The reaction mixture effervesces and methyl mercaptan is given off. When effervescence has ceased the reaction mixture is cooled and 200 parts of water are added. The resulting suspension is stirred and 10 parts of caustic soda dissolved in 30 parts of cold are added. 4-aminobenzenesulphonylguanidine remains undissolved and is filtered off, washed with water and dried.

It may be purified by the method described in Example 1.

*Example 14*

17.2 parts of 4-aminobenzenesulphonamide are dissolved in a mixture of 13.2 parts of potassium phenate and 20 parts of phenol which is stirred and heated to 160°. 13.9 parts of S-methylisothiourea sulphate are added in portions during 2 hours. The reaction mixture effervesces and methyl mercaptan is given off. When effervescence has ceased the reaction mixture is cooled to about 80° C. and 100 parts of benzene are added, whereupon a precipitate is formed. This is filtered off and washed with benzene. It contains crude 4-aminobenzenesulphonylguanidine, which is separated by stirring the precipitate with 10 parts of caustic soda dissolved in 175 parts of cold water. The 4-aminobenzenesulphonylguanidine remains undissolved and is filtered off, washed with water and dried.

It may be purified by the method described in Example 1.

*Example 15*

23.6 parts of the sodium salt of 4-acetylaminobenzenesulphonamide are dissolved in 50 parts of phenol which is stirred and heated to 160° C. 13.9 parts of S-methylisothiourea sulphate are gradually added, in portions, during 2 hours. The reaction mixture effervesces and methyl mercaptan is given off. When effervescence has ceased the mixture is cooled to about 80° C. and 150 parts of benzene are added whereupon a precipitate is formed. This is filtered off and washed with benzene. It contains crude 4-acetylaminobenzenesulphonylguanidine which is isolated by stirring the precipitate with 10 parts of caustic soda dissolved in 175 parts of cold water, whereupon the 4-acetylaminobenzenesulphonylguanidine remains undissolved and is filtered off, washed with water and dried. It is purified, if desired, by recrystallisation from hot water. It forms colourless needles which melt at 264° C.

25.6 parts of this 4-acetylaminobenzenesulphonylguanidine are heated for 1 hour at 90° C. with 100 parts of 5% hydrochloric acid. The solution so obtained is cooled and made alkaline by addition of caustic soda solution, whereupon a precipitate of sulphanilyl guanidine is formed. It is filtered off, washed and dried. It may be purified, if desired, by recrystallisation from water as described in Example 1.

*Example 16*

21.4 parts of 4-acetylaminobenzenesulphonamide, 50 parts of phenol and 16 parts of anhydrous sodium acetate are stirred and heated together at 160° C. To the resulting suspension are added 13.9 parts of S-methylisothiourea sulphate in portions during 2 hours. Effervescence occurs and methyl mercaptan is evolved. When this has ceased the reaction mixture is dissolved in 400 parts of boiling water and the solution is cooled, whereupon 4-acetylaminobenzenesulphonylguanidine separates out. The suspension is stirred and 13 parts of caustic soda dissolved in 30 parts of cold water are added. 4-acetylaminobenzenesulphonylguanidine remains undissolved and is filtered off, washed with water and dried. It is purified if desired by recrystallisation from hot water. It forms colourless needles which melt at 264°.

25.6 parts of this 4-acetylaminobenzenesulphonyl guanidine are heated for 1 hour at 90° C. with 100 parts of 5% hydrochloric acid. The solution so obtained is cooled and made alkaline by the addition of caustic soda solution, whereupon a precipitate of sulphanilyl guanidine is formed. It is filtered off, washed and dried. It may be purified, if desired, by recrystallisation from water as described in Example 1.

*Example 17*

21.4 parts of 4-acetylaminobenzenesulphonamide, 50 parts of phenol and 10.6 parts of anhydrous sodium carbonate are stirred and heated together at 160° C. 13.9 parts of S-methylisothiourea sulphate are added, in portions, during 2 hours. Effervescence occurs and methyl mercaptan is evolved. When this has ceased the reaction mixture is dissolved in 400 parts of boiling water and the solution is cooled, whereupon 4-acetylaminobenzenesulphonylguanidine separates out. The resulting suspension is stirred and 13 parts of caustic soda dissolved in 30 parts of cold water are added. 4-acetylaminobenzenesulphonylguanidine remains undissolved and is filtered off, washed with water and dried.

It is purified and converted to the 4-aminobenzenesulphonylguanidine by the method described in Example 16.

*Example 18*

22.4 parts of the sodium salt of 4-nitrobenzenesulphonamide are dissolved in 25 parts of phenol which are stirred and heated to 160° C. 13.9 parts of S-methylisothiourea sulphate are gradually added, in portions, during 2 hours. The reaction mixture effervesces and methyl mercaptan is given off. When effervescence has ceased the mixture is cooled to about 80° C. and 100 parts of benzene are added whereupon a precipitate is formed. This is filtered off and washed with benzene. It contains crude 4-nitrobenzenesulphonylguanidine which is isolated by stirring the precipitate with 10 parts of caustic soda dissolved in 175 parts of cold water whereupon the 4-nitrobenzenesulphonylguanidine remains undissolved and is filtered off, washed with water and dried. It may be purified, if desired, by recrystallisation from ethyl alcohol. It forms pale yellow prisms which melt at 214° with decomposition.

24.4 parts of the 4-nitrobenzenesulphonylguanidine so obtained are stirred with 100 parts of fine iron filings and 400 parts of water to which 20 parts of concentrated hydrochloric acid have been added. The mixture is heated to 75° C. for ½ hour. The suspension is then made alkaline by addition of sodium hydroxide solution and filtered hot. The filtrate is cooled, whereupon sulphanilyl guanidine separates out in the form of colourless needle-shaped crystals which are filtered off and dried. The compound may be purified further, if desired, by recrystallisation from water. It is thereby obtained in the form of colourless needles of the monohydrate which lose water when heated at 100° and then melt at 189° C.

*Example 19*

22.4 parts of the sodium salt of 4-nitrobenzenesulphonamide and 25 parts of phenol are stirred and heated to 170° C. 15.4 parts of S-allylisothiourea hydrochloride are gradually added, in portions, during 2 hours. The mixture effervesces and allylmercaptan is evolved. When this has ceased the reaction mixture is cooled to about 80° C. and 100 parts of benzene are added whereupon a precipitate is formed. This is filtered off and washed with benzene. It contains crude 4-nitrobenzenesulphonylguanidine which is isolated by stirring the precipitate with 10 parts of caustic soda dissolved in 175 parts of cold water whereupon the 4-nitrobenzenesulphonylguanidine remains undissolved and is filtered off, washed with water and dried. It may be purified, if desired, by recrystallisation from ethyl alcohol. It forms pale yellow prisms which melt at 214° with decomposition.

24.4 parts of the 4-nitrobenzenesulphonyl-guanidine so obtained are stirred with 100 parts of fine iron filings and 400 parts of water to which 20 parts of concentrated hydrochloric acid have been added. The mixture is heated to 75° C. for ½ hour. The suspension is then made alkaline by the addition of sodium hydroxide solution and filtered hot. The filtrate is cooled, whereupon sulphanilylguanidine separates out in the form of colourless needle-shaped crystals which are filtered off and dried. The compound may be purified further, if desired, by recrystallisation from water. It is thereby obtained in the form of colourless needles of the monohydrate which lose water when heated at 100° and then melt at 189° C.

*Example 20*

22.4 parts of the sodium salt of 4-nitrobenzene-sulphonamide and 25 parts of phenol are stirred and heated at 170° C. 23.9 parts of S-cyclohexyl-isothiourea hydrobromide are added, in portions, during 2 hours. The reaction mixture is cooled to about 80° C. and 100 parts of benzene are added whereupon a precipitate is formed. This is filtered off and washed with benzene. It contains crude 4 - nitrobenzenesulphonylguanidine which is isolated by stirring the precipitate with 10 parts of caustic soda dissolved in 175 parts of cold water whereupon 4-nitrobenzenesulphonyl-guanidine remains undissolved and is filtered off, washed with water and dried.

It is purified, if desired, and then converted to 4-aminobenzenesulphonylguanidine by the method described in Example 18.

*Example 21*

20.2 parts of 4-nitrobenzenesulphonamide, 20 parts of phenol and 16 parts of triethanolamine are stirred and heated at 170° C. 13.9 parts of S-methylisothiourea sulphate are added, in portions, during 2 hours. Effervescence occurs and methyl mercaptan is evolved. When this has ceased the reaction mixture is stirred with 200 parts of water and 13 parts of caustic soda dissolved in 30 parts of cold water are added. The crude 4-nitrobenzenesulphonylguanidine remains undissolved and is filtered off, washed and dried. It may be purified, if desired, by recrystallisation from ethyl alcohol when it is obtained in the form of pale yellow prisms which melt at 214° C. with decomposition.

24.4 parts of the 4-nitrobenzenesulphonyl-guanidine so obtained are stirred with 100 parts of fine iron filings and 400 parts of water to which 20 parts of concentrated hydrochloric acid have been added. The mixture is heated to 75° C. for ½ hour. The suspension is then made alkaline by addition of sodium hydroxide solution and filtered hot. The filtrate is cooled, whereupon sulphanilyl guanidine separates out in the form of colourless needle-shaped crystals which are filtered off and dried. The compound may be purified further, if desired, by recrystallisat'on from water. It is thereby obtained in the form of colourless needles of the monohydrate which lose water when heated at 100° C. and then melt at 189° C.

*Example 22*

20.2 parts of 4-nitrobenzenesulphonamide and 25 parts of phenol are stirred and heated at 170° C. and a slow stream of trimethylamine is passed in until the mixture is saturated therewith. Then 13.9 parts of S-methylisothiourea sulphate are added in portions during 2 hours, the passage of trimethylamine gas being continued during this addition. Reaction occurs and methyl mercaptan is evolved. When the reaction is complete, the mixture is stirred with 200 parts of water and 13 parts of caustic soda dissolved in 30 parts of cold water are added. The crude 4-nitrobenzene-sulphonylguanidine remains undissolved and is filtered off, washed and dried.

It is purified, if desired, and then converted to 4-aminobenzenesulphonylguanidine by the method described in Example 18.

*Example 23*

20.2 parts of 4-nitrobenzenesulphonamide, 25 parts of phenol and 9.2 parts of 2-aminopyridine are stirred and heated at 160° C. 13.9 parts of S-methylisothiourea sulphate are added, in portions, during 2 hours. Effervescence occurs and methyl mercaptan is evolved. When this has ceased the reaction mixture is stirred with 200 parts of cold water and 13 parts of caustic soda dissolved in 30 parts of cold water are added. The crude 4-nitrobenzenesulphonylguanidine remains undissolved and is filtered off, washed and dried.

It is purified, if desired, and then converted to 4-aminobenzenesulphonylguanidine by the method described in Example 18.

It will be apparent to one skilled in the art that it is possible, without departing from the spirit and scope thereof, to devise embodiments of this invention other than those set forth in the above examples, and accordingly it is to be understood that the invention is not limited to the particular embodiments therein described, but only as defined in the following claims.

We claim:

1. Process for the manufacture of p-substituted benzene-sulphonylguanidines which comprises causing a sulphonamido compound of the formula (p) X—C₆H₄—SO₂—NH₂, wherein X stands for a radical selected from the group consisting of amino, acylamino and nitro, to react, at a temperature of at least 90° C. and in the presence of an acid-binding agent, with a salt of an isothiourea of the formula

NH₂—C(NH)—S—R wherein R stands for a monovalent hydrocarbon radical.

2. Process as claimed in claim 1 wherein the isothiourea is a S-alkyl isothiourea.

3. Process as claimed in claim 1 wherein the isothiourea salt is S-methyl-isothiourea sulphate.

4. Process as claimed in claim 1 wherein the acid-absorbing agent is a member of the group consisting of the hydroxides of the alkali metals, the hydroxides of the alkaline earth metals and ammonia.

5. Process as claimed in claim 1 wherein the acid-absorbing agent is a salt of a strong base with a weak acid.

6. Process as claimed in claim 1 wherein the acid absorbing agent is sodium phenate.

7. Process as claimed in claim 1 wherein the reaction is carried out in presence of a high-boiling solvent which is inert to the product and to the isothiourea and the sulphonamido compound.

8. Process as claimed in claim 1 wherein the reaction is carried out in the presence of phenol as a solvent.

9. Process as claimed in claim 1 wherein the reaction is carried out at a temperature in the range 120°–200° C.

10. Process for the manufacture of 4-aminobenzene-sulphonyl-guanidine, which comprises reacting an alkali metal salt of 4-aminobenzene-sulphonamide with a salt of an S-alkyl isothiourea at a temperature between 120 and 200° C., and in the presence of a phenol which is liquid at the reaction temperature.

11. Process for the manufacture of 4-amino-benzene-sulphonyl-guanidine, which comprises reacting an alkali metal salt of 4-aminobenzene-sulphonamide with a salt of S-methyl-isothiourea in the presence of phenol as a diluent and at a temperature between 120 and 200° C.

12. Process for the manufacture of 4-amino-benzene-sulphonyl-guanidine, which comprises adding gradually S-methyl-isothiourea sulphate to a solution of the sodium salt of 4-aminobenzene-sulphonamide in phenol, at a temperature of about 160° C., and recovering the reaction product.

13. Process for the manufacture of a p-substituted benzene-sulphonyl-guanidine, which comprises reacting a sulphonamido compound of the general formula (p) X—C₆H₄—SO₂—NH—Z, at a temperature of at least 90° C. and under acid absorbing conditions, with a salt of an inorganic acid and an isothiourea selected from the group consisting of

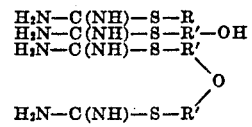

and wherein R is a hydrocarbon radical, R' is an alkylene radical, X stands for a radical of the group consisting of amino, acyl-amino and nitro, while Z stands for a member of the group consisting of hydrogen and alkali-metals.

ERNEST HAWORTH.
FRANCIS LESLIE ROSE.